US007908191B1

(12) United States Patent
Dinamani et al.

(10) Patent No.: US 7,908,191 B1
(45) Date of Patent: Mar. 15, 2011

(54) METHOD AND SYSTEM FOR TRACKING MILES TO DETERMINE TRAVELING DISTANCE

(75) Inventors: Vidya Dinamani, San Diego, CA (US); Richard N. Preece, San Diego, CA (US); David D. Taylor, San Marcos, CA (US); Keith A. Greener, San Diego, CA (US); Alan Tifford, San Diego, CA (US); Cary D. E. Evans, Encinitas, CA (US); Alan F. Buhler, Escondido, CA (US)

(73) Assignee: Intuit Inc., Mountain View, CA (US)

( * ) Notice: Subject to any disclaimer, the term of this patent is extended or adjusted under 35 U.S.C. 154(b) by 140 days.

(21) Appl. No.: 12/276,142

(22) Filed: Nov. 21, 2008

(51) Int. Cl.
*G06F 17/22* (2006.01)
*G07F 19/00* (2006.01)
(52) U.S. Cl. .................. 705/31; 701/200; 340/988
(58) Field of Classification Search .................. None
See application file for complete search history.

(56) References Cited

U.S. PATENT DOCUMENTS

| | | | | |
|---|---|---|---|---|
| 5,220,507 A | * | 6/1993 | Kirson | 701/202 |
| 5,550,738 A | * | 8/1996 | Bailey et al. | 455/456.5 |
| 5,557,524 A | * | 9/1996 | Maki | 701/35 |
| 5,931,878 A | * | 8/1999 | Chapin, Jr. | 701/30 |
| 6,301,533 B1 | * | 10/2001 | Markow | 701/35 |
| 2004/0243489 A1 | * | 12/2004 | Mitchell et al. | 705/30 |
| 2005/0088291 A1 | * | 4/2005 | Blanco et al. | 340/441 |
| 2007/0150139 A1 | * | 6/2007 | Hardy | 701/35 |
| 2007/0208503 A1 | * | 9/2007 | Harnsberger | 701/208 |

* cited by examiner

*Primary Examiner* — F. Zeender
*Assistant Examiner* — Luna Champagne
(74) *Attorney, Agent, or Firm* — Osha • Liang LLP

(57) ABSTRACT

A portable computing device associated with a user for tracking mileage in a motor vehicle, including a processor, a memory, a global positioning satellite (GPS) module configured to determine a physical location of the portable computing device, a tracking application stored in the memory of the portable computing device, wherein the tracking application is configured to activate based on a movement of the portable computing device, determine whether a threshold speed is reached by the portable computing device, record a number of miles traveled by the portable computing device in the motor vehicle to obtain tracking data, and display the tracking data for reconciliation by the user, wherein the tracking application determines physical locations of the user using the GPS module, wherein reconciling data includes indicating which tracking data is business related, and wherein the recorded mileage is configured to be downloaded into a financial application.

18 Claims, 5 Drawing Sheets

METHOD AND SYSTEM FOR TRACKING MILES TO DETERMINE TRAVELING DISTANCE

BACKGROUND

When filing a tax return, a taxpayer (i.e., an individual or business) generally has an opportunity to claim one or more tax deductions, also referred to as tax-deductible expenses. A tax deduction represents an expense incurred by the taxpayer, and may be subtracted from the taxpayer's reported gross income, thereby yielding a lower net income. A lower net income typically incurs lower taxes. Therefore, taxpayers are generally interested in identifying and claiming as many tax deductions as possible.

However, filing a tax return is a notoriously complex process, and it may be difficult for the taxpayer to identify all of the tax deductions available. For example, the number of miles traveled in a car or other transport device for business related work is a tax deductible expense. Often times, taxpayers do not include the number of miles driven in a car for business related travel as a deductible expense because keeping track of the number of miles traveled is difficult and time-consuming. Specifically, a user is required to keep a log of the user's travels and the distance driven for each business-related trip. Therefore, each tax year, many individuals and businesses fail to take advantage of the full extent of tax deductions available to them.

SUMMARY

In general, in one aspect, the invention relates to a portable computing device associated with a user for tracking mileage in a motor vehicle, comprising a processor, a memory, a global positioning satellite (GPS) module configured to determine a physical location of the portable computing device, a tracking application stored in the memory of the portable computing device and configured to interact with the GPS module, wherein the tracking application, when executed by the processor, is configured to automatically activate based on a movement of the portable computing device, determine whether a threshold speed is reached by the portable computing device, record a number of miles traveled by the portable computing device in the motor vehicle when the threshold speed is reached to obtain tracking data, wherein the tracking application determines a plurality of physical locations of the user using the GPS module, and display the tracking data for reconciliation by the user, wherein reconciling data comprises indicating which tracking data is business related, wherein the recorded mileage is stored in the memory of the portable computing device and configured to be downloaded into a financial application.

In general, in one aspect, the invention relates to a method for tracking mileage traveled in a motor vehicle, comprising obtaining information associated with a business appointment of a user from an electronic organizer application, computing a number of future potential miles associated with traveling to the business appointment in the motor vehicle, storing the computed future potential miles, automatically activating a tracking application based on a movement of a portable computing device associated with the user, determining whether a threshold speed is reached by the portable computing device, recording a number of miles traveled by the portable computing device in the motor vehicle when the threshold speed is reached to obtain tracking data, wherein the tracking application comprises GPS functionality to determine a plurality of physical locations of the user, and wherein the recorded mileage is configured to be downloaded into a financial application, reconciling the computed future potential miles with the number of miles, and displaying the tracking data and the plurality of physical locations traveled to by the user using the GPS functionality.

In general, in one aspect, the invention relates to a computer readable medium for tracking mileage traveled in a motor vehicle, comprising software instructions executed by a processor to automatically activate a tracking application based on a movement of a portable computing device associated with a user, determine whether a threshold speed is reached by the portable computing device, record a number of miles traveled by the portable computing device in the motor vehicle when the threshold speed is reached to obtain tracking data, wherein the tracking application comprises GPS functionality to determine a plurality of physical locations of the user, and display the tracking data for reconciliation by the user, wherein reconciling data comprises indicating which tracking data is business related and storing the business related track data into a repository, and wherein the recorded mileage is configured to be downloaded into a financial application.

Other aspects of the invention will be apparent from the following description and the appended claims.

DETAILED DESCRIPTION

Figure 1:
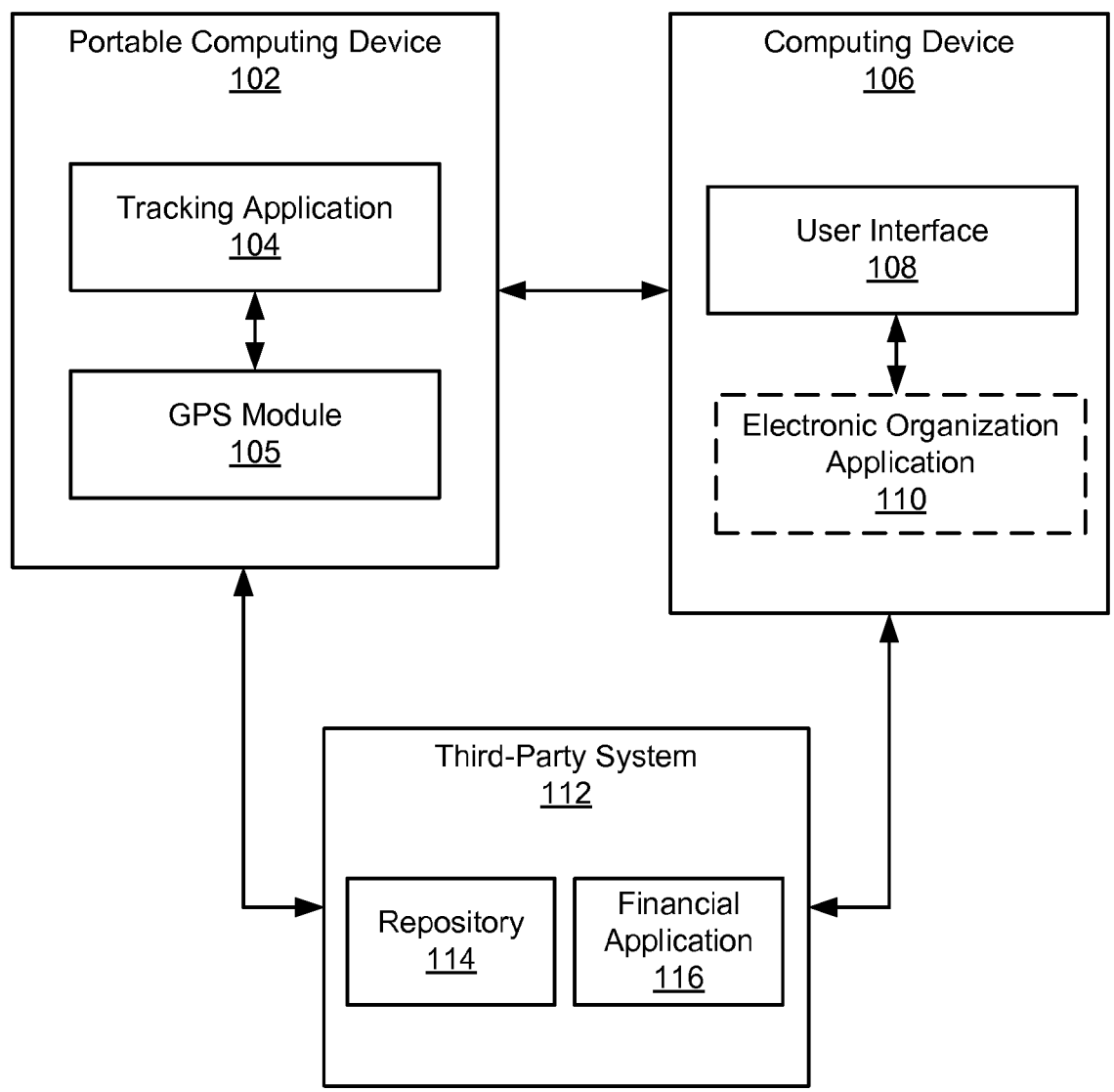
FIG. 1 shows a system for tracking business expenses in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to method for tracking business related expenses. More specifically, embodiments of the invention provide a method for tracking the number of miles driven in a car for business related travel using a portable computing device that follows a user. Embodiments of the invention provide both a passive and a user-initiated method for tracking business related expenses.

FIG. 1 shows a system in accordance with one or more embodiments of the invention. Specifically, FIG. 1 shows a portable computing device (102), a computing device (106) and a third party system (112). Each of the aforementioned components of the system is explained below.

The portable computing device (102) includes a tracking application (104) and a global positioning satellite (GPS) module (105). In one or more embodiments of the invention, the portable computing device (102) is configured to store and execute the tracking application (104) and the GPS module (105). In one or more embodiments of the invention, the portable computing device (102) is a mobile phone. Alternatively, the portable computing device (102) may be any portable electronic device, such as a personal digital assistant, a media device, etc. Those skilled in the art will appreciate that although not shown in FIG. 1, the portable computing device includes essential components found in most electronic devices, such as a processor for executing the tracking application, a memory for storing the tracking application and tracking data, a display device and user interface for communicating with a user associated with the portable computing device, and an external communication interface for connecting to any wired, wireless network, and/or GPS network.

The tracking application (104) is configured to track (i.e., follow) the movements of the portable computing device to obtain tracking data. More specifically, the tracking application (104) is configured to track the number of miles (or other unit of distance) traveled by the portable computing device in a motor vehicle. The tracking application (104) is also configured to compute the number of future potential miles traveled in by a user for a business related trip in a motor vehicle.

In one or more embodiments of the invention, the portable computing device is carried by a user. Thus, by tracking the movement of the portable computing device, the tracking application (104) and the GPS module (105) effectively track the movements and physical locations of a user carrying the portable computing device. Therefore, throughout the remainder of this disclosure, the phrases "tracking the user" and "tracking the portable computing device" may be used interchangeably. Further, those skilled in the art will appreciate that the user may be any individual who wishes to track business expenses such as the number of miles driven for purposes of business.

The GPS module (105) is configured to determine geographical locations of the portable computing device. Those skilled in the art will appreciate that the GPS module is a chip (i.e., an integrated circuit) that is a component of the portable computing device and is configured to determine a physical location of the portable computing device and includes functionality found in GPS devices that are well known in the art.

The computing device (106) may be any personal computer, such as a laptop, a desktop system, a thin computer, etc. In one or more embodiments of the invention, the computing device may include a larger display and graphics ability than the portable computing device and is configured to display tracking data for reconciliation by the user. The computing device (106) includes a user interface (108) and an electronic organization application (110). In one or more embodiments of the invention, the computing device (106) may also be configured to store the tracking data obtained by the tracking application. Those skilled in the art will appreciate that the computing device (106) is not limited to a large system and may also be a hand-held or portable electronic device on which the user can view displayed tracking data.

Further, those skilled in the art will appreciate that although not shown in FIG. 1, the computing device includes essential components found in most computer systems, such as a processor for executing the electronic organization application, a memory for storing data, a display device for displaying the user interface for communicating with a user, an input device, such as a keyboard, and an external communication interface for connecting to any wired or wireless network.

The user interface (108) is configured to display, among other data, tracking data. For example, the user interface (108) may display tracking data on a geographical map or a graph that specifies the physical locations visited by the portable computing device. Further, the user interface (108) is configured to take input from the user for the reconciliation of tracking data.

The electronic organization application (110) may be any locally stored or web-based application, which the user uses as an organizer to store appointments, contacts, etc. For example, the electronic organization application (110) may be an address book application, a calendar application, or any application that includes address book and/or calendar functionality, such as an e-mail client. More specifically, for example, the electronic organization application (110) may be Microsoft Outlook® (Outlook is a registered trademark of Microsoft Corporation), Google™ Calendar, etc. (Google is a trademark of Google, Inc., Mountain View, Calif.). The electronic organization application (110) is configured to store a plurality of activities associated with the user. For example, the electronic organization application (110) may store a user's business appointments, charity events, doctor appointments, and/or the names and addresses associated with such appointments, such as the names and addresses of clients, doctors, charity drop-off locations, etc.

Those skilled in the art will appreciate that although FIG. 1 shows both a portable computing device and a computing device, embodiments of the invention may be implemented without the use of a computing device. Rather, reconciliation of data may be performed on a user interface and a display associated with the portable computing device. Further, as described above, the electronic organization application may reside on the portable computing device.

The third-party system (112) may be server or computing device hosted by a third-party vendor or financial institution. In one or more embodiments of the invention, the third-party may be an organization associated with financial data management. For example, in one or more embodiments of the invention, the third-party may be a company that hosts software applications related to filing taxes, such as Intuit, Inc. In this case, the third-party system (112) may be a system for tax preparation.

In one or more embodiments of the invention, the third-party system (112) includes a repository (114) and a financial application (116). The repository (114) is a storage unit, such as a file system, a database management system, a relational database, a spreadsheet, a program memory, or other system or mechanism for storing data. The repository (114) may be distributed across multiple vendors or financial institutions or stored with a single vendor or financial institution. Further, although shown as being associated with the third-party system (112), the repository (114) may be stored on the computing device (106) or the portable computing device (102) operated by the user. Further, the repository (114) may be accessible using an Internet, Intranet, or from a local storage device. In one or more embodiments of the invention, the repository (114) is configured to store tracking data obtained by the tracking application. In one or more embodiments of the invention, in the case where the third-party system is configured to aid a user in tax preparation, the repository (114) may be a deduction repository configured to store tracking data related to tax deductible business expenses, such as mileage associated with a business trip.

The financial application (116) may be any financial management software used by a consumer to manage financial data. For example, a financial application may be an accounting application, a tax preparation application, a payroll application, an invoicing application, or any other type of financial application. Although shown as being associated with the third-party system (112), the financial application (116) may execute locally (e.g., on the computer device (106) or portable computing device (102) of the user) or remotely, such as from the third-party system (112). In one or more embodiments of the invention, the financial application (116) is tax preparation software that is configured to use the tracking data related to tax deductions stored in the repository (114) to complete a user's taxes.

Figure 2:
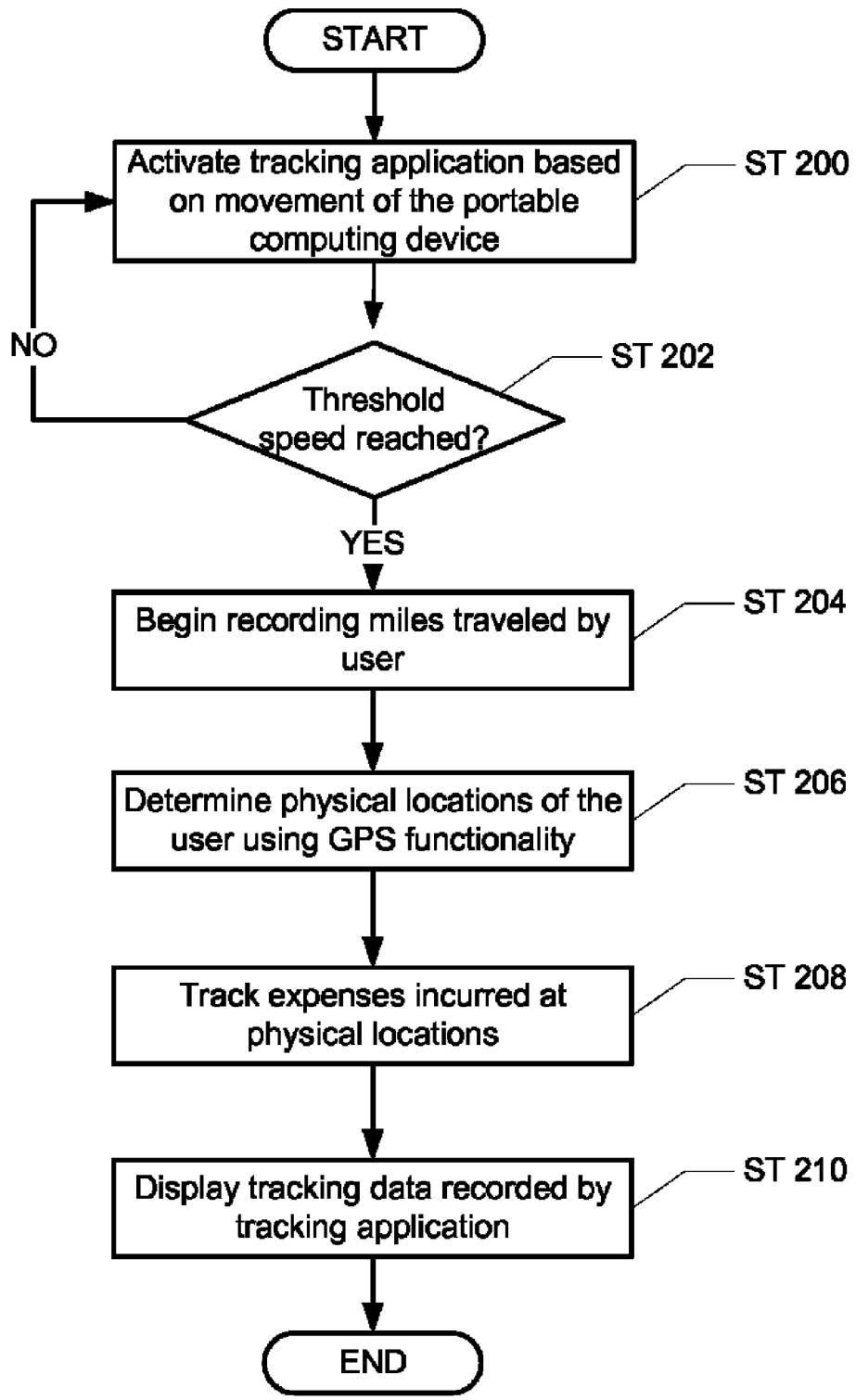
FIG. 2 shows a flow chart for a method for tracking miles traveled in a motor vehicle from a device perspective in accordance with one or more embodiments of the invention.

FIG. 2 shows a flow chart from the device perspective for tracking mileage traveled in a motor vehicle in accordance with one or more embodiments of the invention. While the various steps in the flowchart of FIG. 2 are presented and described sequentially, one of ordinary skill in the art will appreciate that some or all of the steps may be executed in different orders, may be combined or omitted, and some or all of the steps may be executed in parallel. Accordingly, the specific arrangement of steps shown in FIG. 2 is not meant to limit the scope of the invention.

Initially, the tracking application is activated based on movements of the portable computing device (ST 200). The tracking application may automatically activate, or the user may initiate the activation of the tracking application on the portable computing device. Those skilled in the art will appreciate that the tracking application may be downloaded and stored onto the user's portable computing device before the method of FIG. 2 takes place. Subsequently, a determination is made by the tracking application as to whether a threshold speed of the portable computing device is reached (ST 202). That is, the tracking application determines whether the user is traveling at a speed that is faster than a pre-determined threshold speed in order to determine whether the user is traveling by motor vehicle. In one or more embodiments of the invention, the pre-determined threshold speed may be in the range of 5-7 mph. Those skilled in the art will appreciate that when the computing device is not traveling at a speed that is faster than the threshold speed, the tracking application assumes that the user is stationary or walking, and therefore, does not track the mileage traveled by the user. Thus, if the threshold speed is not reached, the method returns to ST 200 until the threshold speed is reached.

When the threshold speed is reached (ST 202), the tracking application begins recording miles traveled by the user (St 204). The tracking application operates in conjunction with the GPS module that provides GPS functionality within the portable computing device to determine physical locations of the user (ST 206). In one or more embodiments of the invention, the physical locations determined using the GPS functionality within the portable computing device may be used to determine, for example, whether the user is stuck in traffic, and/or to determine whether the user has reached a particular destination. Alternatively, in one or more embodiments of the invention, the GPS functionality is used to determine whether the user has stopped traveling in the motor vehicle and is making a business-related purchase. In this case, expenses incurred at the physical location where the user is stopped to make a business purchase are tracked (ST 208). For example, the GPS functionality within the portable computing device may include pre-set locations for business stores, such as Staples™, Office Depot™, etc. Thus, when the user stops to make a purchase at one of the pre-set business locations recognized by the GPS module, the tracking application may track the expenses incurred as a result of the purchase made at the business location.

The portable computing device then displays the tracking data recorded by the tracking application and stored in the portable computing device (ST 210). In one or more embodiments of the invention, the portable computing device may be connected to another computing device with enhanced display capabilities to display the tracking data. Alternatively, the portable computing device may be equipped with display functionality and graphic ability, in which case the tracking data may be displayed on the portable computing device itself.

In one or more embodiments of the invention, FIG. 2 illustrates a passive method for tracking a user's business mileage and business expenses, in which no interaction with the tracking application is required by the user. That is, a user simply carries a portable computing device on his/her person, and the device constantly tracks the user's physical location and mileage traveled in a motor vehicle, no matter where the user is traveling. For example, a user may turn on the tracking application stored within their GPS enabled mobile device. The tracking application monitors the user's (or the portable computing device's) GPS location at a specified intervals of time and calculates the rate of change between the two points in the interval of time to determine the rate of speed (if any) that the user is traveling. Subsequently, for a given threshold (e.g., >6 mph) the tracking application assumes that the user is no longer walking and therefore must be traveling in a motor vehicle. While the user is moving, the tracking application records the distance that the user has traveled that is greater than 6 mph. Further, in one or more embodiments of the invention, when the portable computing device's GPS coordinates lie on a highway, and the speed is less than 6 mph, the tracking application assumes the user is in traffic and continues to track the miles driven, rather than assuming that the user has stopped traveling in the motor vehicle and is walking.

Although not discussed in FIG. 2, in one or more embodiments of the invention, while the user is traveling in the motor vehicle, the application may show the user's distance traveled, and the user, by entering the cost of gasoline and the estimated fuel efficiency of the motor vehicle, may view a display similar to that of a Taxicab driver's meter that indicates the total expense of the trip.

Further, although FIG. 2 discussed a passive method for tracking the miles traveled in a motor vehicle, embodiments of the invention may also employ a user initiated method for determining miles driven in a motor vehicle. For example, at the start of a user's business trip, the user may initiate his/her GPS enabled mobile device and press a 'Start Trip' button displayed on the mobile phone to initiate the tracking application. At this stage, the tracking application records the coordinates of the starting point of the trip. The user may subsequently turn off the mobile device, put it away or otherwise leave the device alone until they reach the end of their destination, at which point the tracking application may be re-started by pressing a "destination" button. The tracking application then records the coordinates of the destination point of the trip. Using the starting and destination coordinates, the tracking application may then compute the mileage traveled and store this number for use by the user in financial data management, deducting mileage traveled as a business expense, or submitting expense reports for reimbursement. In the user initiated method described above, the user must start and stop the tracking application each time a business-related trip is taken.

Figure 3:
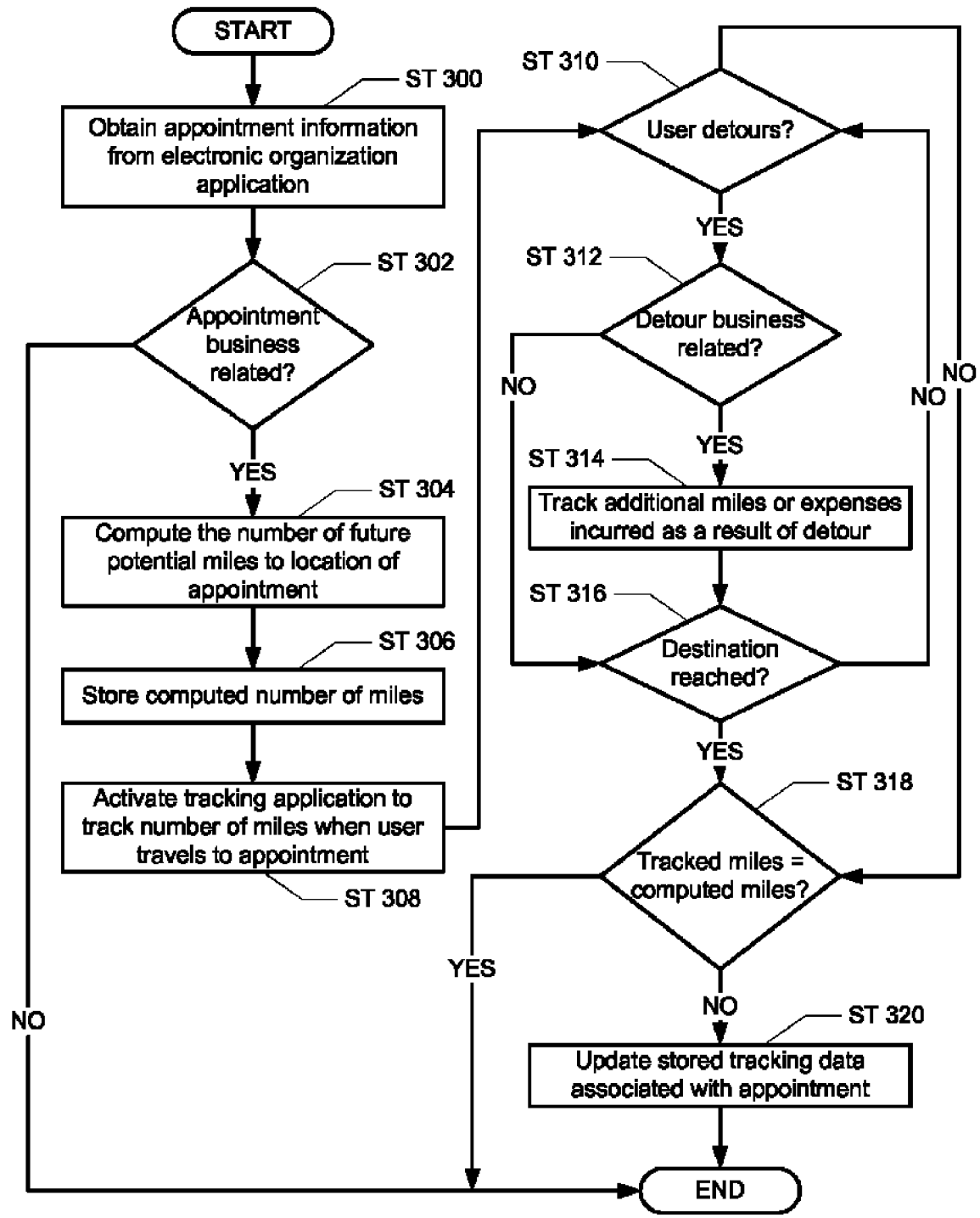
FIG. 3 shows a flow chart for determining future potential mileage associated with a business appointment in accordance with one or more embodiments of the invention.

FIG. 3 shows a flow chart for computing future potential miles traveled in a motor vehicle in accordance with one or more embodiments of the invention. While the various steps in the flowchart of FIG. 3 are presented and described sequentially, one of ordinary skill in the art will appreciate that some or all of the steps may be executed in different orders, may be combined or omitted, and some or all of the steps may be executed in parallel. Accordingly, the specific arrangement of steps shown in FIG. 3 is not meant to limit the scope of the invention.

Specifically, FIG. 3 describes a method for tracking business related mileage and expenses in which the tracking application is learning software that is proactive in determining business-related expenses for a user. Initially, the tracking application obtains appointment information from an electronic organization application (ST 300). More specifically, in one or more embodiments of the invention, the tracking application may include a component that links to an electronic organization application, such as an e-mail client that includes calendar functionality. In this case, the tracking application recognizes when a user makes an appointment and places the appointment on an electronic calendar application. The appointment information is then used to obtain a physical address or location for the appointment. In one or more embodiments of the invention, the tracking application may include functionality to learn and build up knowledge regarding the user's business contacts. For example, over time, by tracking the user's business trips on a constant basis, the tracking application may store the names of business contacts for the user in memory, and may recognize an appointment made in a calendar or address book application to be a business related appointment (ST 302).

Continuing with FIG. 3, when an appointment is business related (ST 302), the tracking application automatically determines that the appointment requires business travel using a motor vehicle. Thus, the tracking application computes the number of future potential miles to the location of the business related appointment, before the appointment takes place (ST 304). The tracking application may also use GPS functionality to map out a route to travel to the business related appointment. When the appointment is not business related, the process ends. Those skilled in the art will appreciate that if the tracking application has not built up enough knowledge to recognize a new appointment as business related, the tracking application may proceed to compute future potential miles for the appointment. The user may then reconcile the tracking data at a later point in time. Subsequently, the computed number of future potential miles is stored (ST 306). The future potential mileage computed may be stored on the portable computing device, downloaded onto another computing device, or stored in a repository on a third party system.

When the user begins the trip to travel to the appointment, the tracking application begins tracking and recording the mileage traveled, based on the method described above with respect to FIG. 2 (ST 308). At this stage, a determination is made as to whether the user detours while traveling to the appointment (ST 310). In one or more embodiments of the invention, the user detours when the user makes a stop (recognized by the threshold speed level and the GPS functionality) or takes a route that deviates from the route calculated by the tracking application or is not recognized by the tracking application. When the user detours (ST 310), another determination is made as to whether the detour is business related (ST 312). For example, if the user stops for gas, then this may be deemed as a business related expense, such that the detour (the stop for gas) is business related. In another example, in one or more embodiments of the invention, if the user takes a longer route to stop at a Staples™ to pick up material for the appointment, then this is also a business related detour.

The tracking application may determine whether the detour is business related using a variety of methods. For example, in one or more embodiments of the invention, the tracking application may be configured to prompt the user on the portable computing device via a text message or e-mail message to confirm whether the recognized detour is business related. Alternatively, the tracking application may use GPS functionality to determine the physical location of the user during the detour, and if the physical location is a pre-set business location, such as an Office Depot™ or Staples™ location, then the tracking application may automatically deem the detour to be business related.

When the detour is business related, the tracking application continues to track the additional miles traveled and any additional expenses incurred as a result of the detour (ST 314). To determine whether any expenses were incurred during the detour, the tracking application may again prompt the user on the portable computing device to confirm whether any expenses were incurred and to input the total cost of the incurred expense. Thus, in one or more embodiments of the invention, the tracking application may proactively ask for information on a timely basis during the detour, such that the user does not have to remember to record any additional expenses incurred in addition to the mileage traveled for the business related detour. Said another way, the tracking application may eliminate the user's responsibility to create a log of the expenses incurred during a business trip.

When the detour is not business related (ST 312), or after the additional miles and/or expenses resulting from the detour are recorded, the tracking application determines whether the user's destination is reached (ST 316). When the appointment destination is not reached, e.g., when the tracking application determines that the user has stopped, but not at the destination known to the tracking application for the appointment, the process returns to ST 310 to determine if the user detoured. If the appointment destination is reached, the tracking application compares the number of tracking miles to the number of future potential miles computed before the business trip occurred (ST 318). When the tracked miles match the future potential miles computed, the process ends.

Alternatively, when the tracked miles do not match the future potential miles computed, the stored tracking data associated with the appointment is updated to reflect the higher or lower number of miles tracked (ST 320). Returning to ST 310, when the user does not detour on the way to the business appointment, the process simply skips to ST 318, where the mileage comparison is performed to determine whether the stored future potential miles need to be updated.

For example, suppose the tracking application determines that the number of tracked miles to the appointment is less than the number of future potential miles computed. In this case, the tracking application may simply assume that the user took a shorter route without detouring, and update the recorded number of miles for the appointment. Alternatively, consider the scenario in which the tracking application does not track a detour, but tracks a number of miles that is greater than the number of future potential miles computed. In this case, when the user's destination is reached, the tracking application may prompt the user on the portable computing device to determine whether a detour was taken and whether the detour was business related. The tracking application may then update the tracking data stored according to the user's response(s).

Figure 4:
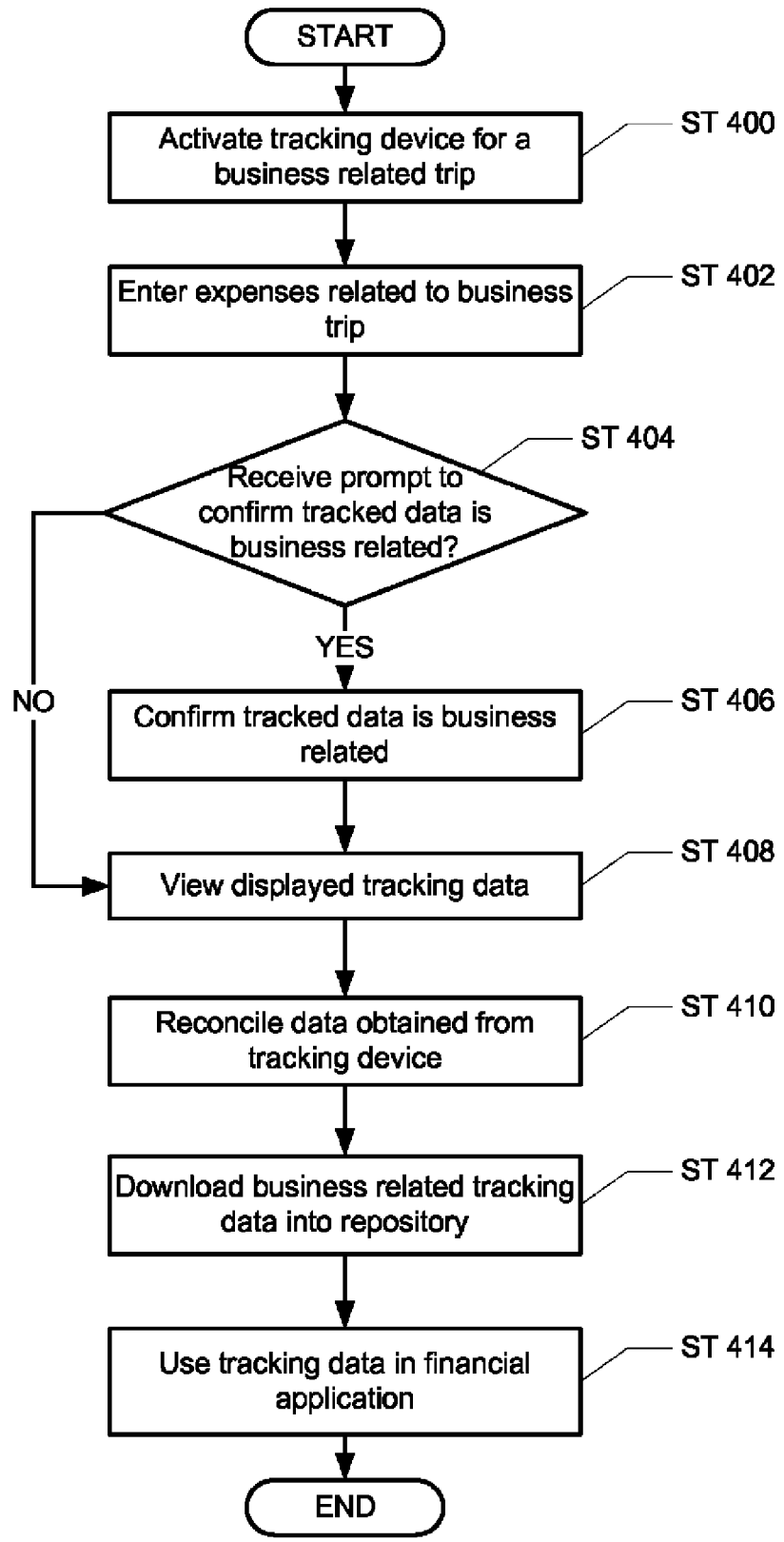
FIG. 4 shows a flow chart for a method for tracking business related expenses from a user perspective in accordance with one or more embodiments of the invention.

FIG. 4 shows a flow chart from the user perspective for tracking mileage traveled in a motor vehicle in accordance with one or more embodiments of the invention. Specifically, FIG. 4 shows a method for tracking mileage for business related expenses from a user perspective. While the various steps in the flowchart of FIG. 4 are presented and described sequentially, one of ordinary skill in the art will appreciate that some or all of the steps may be executed in different orders, may be combined or omitted, and some or all of the steps may be executed in parallel. Accordingly, the specific arrangement of steps shown in FIG. 4 is not meant to limit the scope of the invention.

Initially, the user activates the tracking application and/or the portable computing device for a business related trip (ST 400). Subsequently, the user enters known expenses related to the business trip (St 402). For example, if the user knows of expenses to be incurred related to the business trip, then the user may enter such expenses so that the tracking application can record and store the expenses. At this stage, after user movement beyond the threshold speed is detected, a determination is made as to whether the user receives a prompt to confirm that the tracked data is business related (ST 404). When the user receives such a prompt on the portable computing device, the user may respond by confirming that the tracked data is business related (ST 406). Alternatively, although not shown in FIG. 4, the user may also disregard the prompt or respond by indicating that the tracked data is not business related.

If the user does not receive a prompt on the portable computing device, or after confirming the nature of the tracked data, the user views a display of the tracking data recorded by the tracking application (ST 408). In one or more embodiments of the invention, the tracking data may be displayed in graphical form, plotted on a geographical map, or displayed in any other organized manner. Further, the user may view tracking data on a periodic basis, such as once a week, at the end of each day, once a month, etc. This time period may be defined by the user.

At this stage, the user reconciles the tracking data displayed (ST 410). In one or more embodiments of the invention, reconciling tracking data involves determining and specifying which of the tracked data is business related and can be applied to business related expense reports or applied to tax deductible expenses. For example, in the scenario described above in FIG. 2 where the tracking application follows the user constantly, the user may have significant data to reconcile, because not all motor vehicle travel by the user in a day or week time frame would be business related. Alternatively, in the scenario described in FIG. 3, where the tracking application is proactive in determining and reconciling future potential mileage traveled, the user may have less data reconciliation to perform.

The user may subsequently download or store the business related tracking data in a repository (ST 412). In one or more embodiments of the invention, the user may download the reconciled tracking data into a deduction repository hosted by a third-party system. In one or more embodiments of the invention, the reconciled tracking data may be imported into a financial application (ST 414). For example, in one or more embodiments of the invention, the deduction repository may be hosted by an organization associated with tax preparation software applications and related financial applications. This organization may provide a web-based site for tax filers to download tax deductible expenses such that the downloaded information is used by a related financial or tax preparation software product that aids the user in filing taxes. For example, the deduction repository may be operatively connected to a software such as Turbo Tax® (Turbo Tax is a registered trademark of Intuit, Inc., Mountain View Calif.), and the reconciled data may be automatically imported into Turbo Tax® may to complete a user's taxes.

Alternatively, in one or more embodiments of the invention, a user may store the reconciled tracking data in any repository, and subsequently provide the data to an accountant for purposes of filing taxes. Those skilled in the art will appreciate that embodiments of the invention are not limited to using the reconciled data for tax related purposes. For example, a user may simply use the reconciled data to complete expense reports, reimbursement forms for an employer, or for any other suitable purpose.

In one or more embodiments of the invention, the tracking application is configured to access a user's credit card statements to determine whether any past expenses or purchases made are business related. For example, when the portable computing device is connected to a financial application used to manage the user's expenses, the tracking application may access the financial application data to determine whether any recent credit card purchases are potential business related expenses. Alternatively, the tracking application may, via a network connection, access and download the user's credit card information on a periodic basis for the aforementioned purpose. In this manner, using the learning ability and knowledge database of the tracking application, the user may be prompted to confirm whether particular transactions on a credit card statement are business related. For example, suppose the tracking application downloads credit card transactions and determines that the user made a purchase at a Staples™ location that is not near the user's home or office, but is close to a client's office. In this case, the tracking application may prompt the user on the portable computing device to confirm whether the purchase at the Staples™ was business related. In addition, the tracking device may also prompt the user to confirm whether the user took a business trip in a motor vehicle to the client's office location (assuming the tracking application did not already track and record that business trip). The user may then confirm both prompts as being business related. In one or more embodiments of the invention, if a user identifies particular transactions as business related, the tracking application may automatically store the expenses and/or mileage associated with a business trip during which the transaction took place, into the repository.

Embodiments of the invention provide a system and method for a device that follows a user to track business expenses and miles traveled in a motor vehicle. Thus, embodiments of the invention provide a system and method that looks forward in computing future potential mileage traveled by a user, looks backward to ensure the user has not overlooked any tax deductible or business related expenses, and also tracks the user's present movements in order to provide a robust and complete mechanism for identifying a user's business related travels and expenses.

Figure 5:
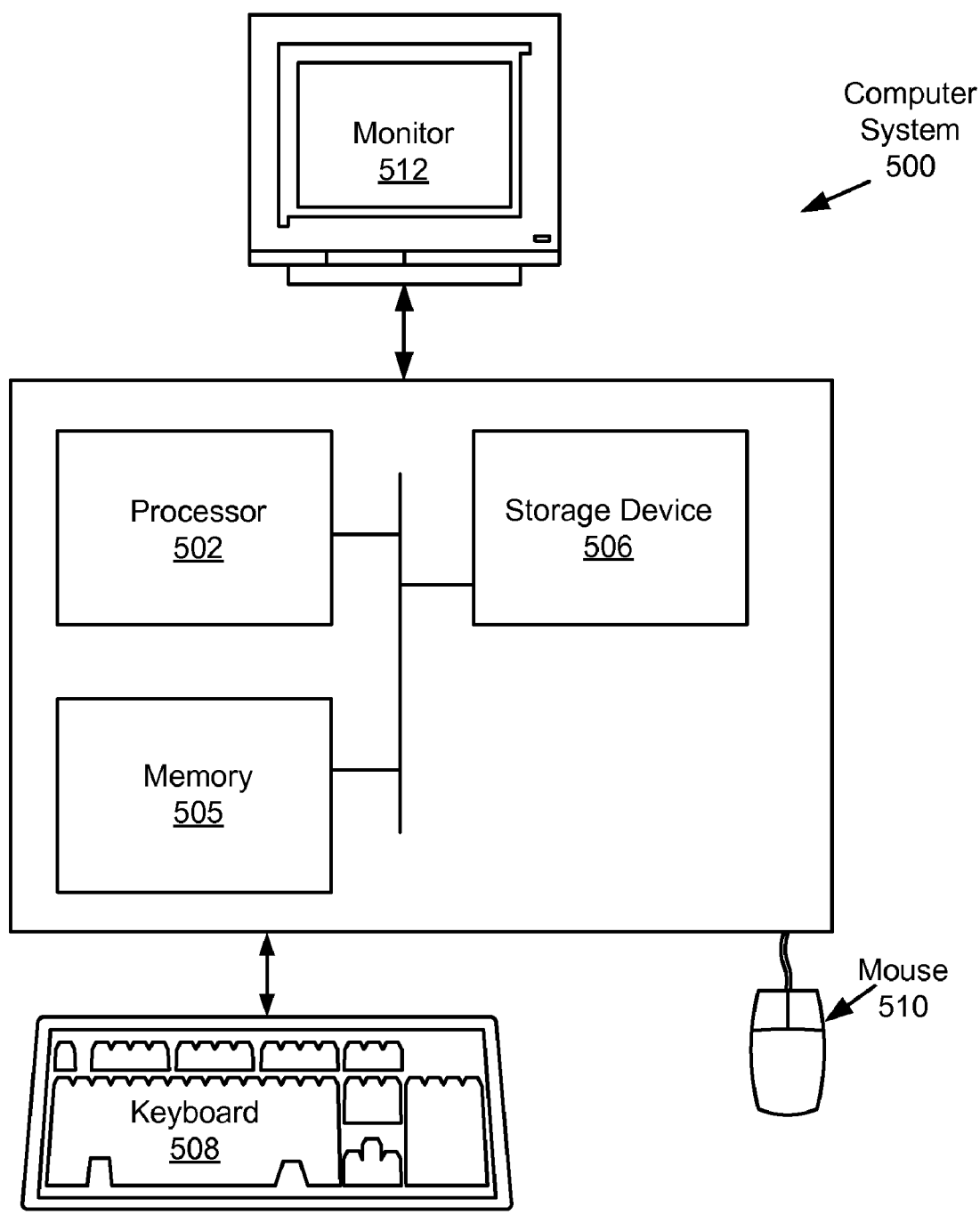
FIG. 5 shows a computing device in accordance with one or more embodiments of the invention.

The invention may be implemented on virtually any type of computing device regardless of the platform being used. In one or more embodiments of the invention, a computing device may be used to plot the locations traveled by car on a map or graph, where the computing device is configured to display the map and/or graph. Further, the computing device may be used to reconcile the data obtained from the tracking device by the user. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms, now known or later developed.

Further, those skilled in the art will appreciate that one or more elements of the aforementioned computer system (500) may be located at a remote location and connected to the other elements over a network. Further, software instructions to perform embodiments of the invention may be stored on any tangible computer readable medium such as a compact disc (CD), a memory card or USB device, a diskette, a tape, or any other suitable tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A portable computing device associated with a user for tracking mileage in a motor vehicle, comprising:
    a processor;
    a memory;
    a global positioning satellite (GPS) module configured to determine a physical location of the portable computing device;
    a tracking application stored in the memory of the portable computing device and configured to interact with the GPS module, wherein the tracking application, when executed by the processor, is configured to:
        automatically activate based on a movement of the portable computing device;
        determine whether a threshold speed is reached by the portable computing device;
        record a number of miles traveled to a business appointment by the portable computing device in the motor vehicle when the threshold speed is reached to obtain tracking data, wherein the tracking application determines a plurality of physical locations of the user using the GPS module; and
        send the tracking data to a second computing device, wherein the second computing device is configured to:
            obtain information associated with the business appointment of the user from an electronic organizer application configured to execute in the second computing device,
            compute a number of future potential miles associated with traveling to the appointment in the motor vehicle,
            once computed, store the number of future potential miles as stored potential miles,
            receive the tracking data from the portable computing device, and
            display the tracking data and the stored potential miles for reconciliation by the user to obtain reconciled data,
            receive reconciled data from the user, wherein the reconciled data comprises data the user identifies as actual business related mileage data using the tracking data and the stored potential miles, and
            configure the reconciled data to be downloaded into a tax preparation software.

2. The portable computing device of claim 1, wherein reconciling the computed future potential miles with the number of miles comprises:
    determining that the user took a detour while traveling to the business appointment using the GPS module;
    updating the stored future potential miles when the detour is business related,
    wherein the tracking application is configured to determine whether the detour is business related by prompting the user to confirm that the detour is business related on the portable computing device.

3. The portable computing device of claim 1, wherein the tracking application is further configured to:
    obtain a plurality of previous transactions completed by the user from an expense report associated with the user; and
    determine a subset of previous transactions from the plurality of previous transactions that are business related;
    compute business related expenses from the subset of previous transactions; and
    store the business related expenses in the tax preparation software.

4. The portable computing device of claim 1, wherein the tax preparation software is configured to help the user file taxes, and wherein the tracking data is stored in a deduction repository and is applied to obtain tax deductions for the user.

5. The portable computing device of claim 1, wherein the tracking data is displayed on a geographical map comprising the plurality of physical locations traveled to by the user.

6. The portable computing device of claim 1, wherein the portable computing device is a mobile phone.

7. The portable computing device of claim 1, wherein the tax preparation software is hosted by a third-party system configured to manage financial data.

8. The portable computing device of claim 1, wherein the threshold speed is six miles per hour.

9. The portable computing device of claim 1, wherein the tracking application is further configured to:
    determine whether at least one of the plurality of physical locations of the user is a business location using the GPS module; and
    track at least one expense incurred by the user at the business location.

10. The portable computing device of claim 9, wherein the business location is determined by prompting the user and receiving a confirmation from the user in response to the prompt that the at least one physical location is the business location.

11. A computer readable medium for tracking mileage traveled in a motor vehicle, comprising software instructions executed by a processor to:
    automatically activate a tracking application based on a movement of a portable computing device associated with a user;
    determine whether a threshold speed is reached by the portable computing device;
    record a number of miles traveled to a business appointment by the portable computing device in the motor vehicle when the threshold speed is reached to obtain tracking data, wherein the tracking application comprises GPS functionality to determine a plurality of physical locations of the user; and
    send the tracking data to a second computing device, wherein the second computing device is configured to:
        obtain information associated with the business appointment of the user from an electronic organizer application configured to execute in the second computing device,
        compute a number of future potential miles associated with traveling to the appointment in the motor vehicle,
        once computed, store the number of future potential miles as stored potential miles,
        receive the tracking data from the portable computing device, and display the tracking data and the stored potential miles for reconciliation by the user to obtain reconciled data, receiving reconciled data from the user, wherein the reconciled data comprises data the user identifies as actual business related mileage data using the tracking data and the stored potential miles, and configuring the reconciled data to be downloaded into a tax preparation software.

12. The computer readable medium of claim 11, wherein the software instructions are further configured to:

determine whether at least one of the plurality of physical locations of the user is a business location using the GPS module; and track at least one expense incurred by the user at the business location.

13. The computer readable medium of claim 11, wherein the tracking application is configured to be downloaded onto a mobile phone.

14. The computer readable medium of claim 11, wherein the tracking data is displayed on a geographical map comprising the plurality of physical locations traveled to by the user.

15. The computer readable medium of claim 11, wherein the tax preparation software is configured to help the user file taxes, and wherein the tracking data is stored in a deduction repository and is applied to obtain tax deductions for the user.

16. A method for tracking mileage traveled in a motor vehicle, comprising:

obtaining information associated with a business appointment of a user from an electronic organizer application;

computing a number of future potential miles associated with traveling to the business appointment in the motor vehicle;

storing the computed future potential miles;

automatically activating a tracking application based on a movement of a portable computing device associated with the user;

determining whether a threshold speed is reached by the portable computing device;

when the threshold speed is reached, recording a number of miles traveled to the business appointment by the portable computing device in the motor vehicle when the threshold speed is reached to obtain tracking data, wherein the tracking application comprises GPS functionality to determine a plurality of physical locations of the user;

receiving the tracking data from the portable computing device;

displaying the tracking data and the stored potential miles for reconciliation by the user to obtain reconciled data receive reconciled data from the user, wherein the reconciled data comprises data the user identifies as actual business related mileage data using the tracking data and the stored potential miles; and configuring the reconciled data to be downloaded into a tax preparation software.

17. The method of claim 16, wherein reconciling the computed future potential miles with the number of miles comprises:

determining that the user took a detour while traveling to the business appointment;

updating the stored future potential miles when the detour is business related, wherein the tracking application determines whether the detour is business related by sending a message to the user on the portable computing device to confirm that the detour is business related.

18. The method of claim 16, wherein the tax preparation software is configured to help the user file taxes, and wherein the tracking data is stored in a deduction repository and is applied to obtain tax deductions for the user.

* * * * *